No. 774,697. PATENTED NOV. 8, 1904.
M. A. RITTER.
CAKE BEATER.
APPLICATION FILED MAR. 28, 1904.
NO MODEL.

WITNESSES:
C. Edward Duffey
Perry B. Turpin

INVENTOR
Michael A. Ritter
BY Munn & Co.
ATTORNEYS

No. 774,697.

Patented November 8, 1904.

UNITED STATES PATENT OFFICE.

MICHAEL A. RITTER, OF CARLISLE, KENTUCKY.

CAKE-BEATER.

SPECIFICATION forming part of Letters Patent No. 774,697, dated November 8, 1904.

Application filed March 28, 1904. Serial No. 200,428. (No model.)

*To all whom it may concern:*

Be it known that I, MICHAEL A. RITTER, a citizen of the United States, and a resident of Carlisle, in the county of Nicholas and State of Kentucky, have made certain new and useful Improvements in Cake-Beaters, of which the following is a specification.

My invention is an improvement in cake-beaters, seeking to provide a novel construction whereby the dough may be beat or worked the desired way and by which the dough may be scraped from the bowl when desired; and the invention consists in certain novel constructions and combinations of parts, as will be hereinafter described and claimed.

Figure 1:
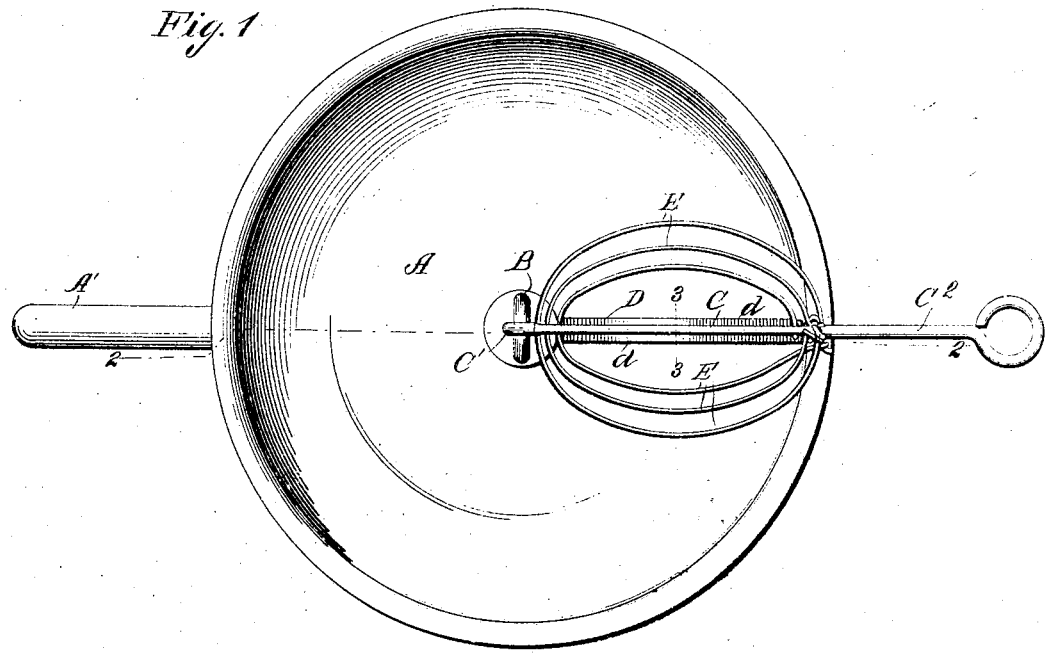
Figure 2:
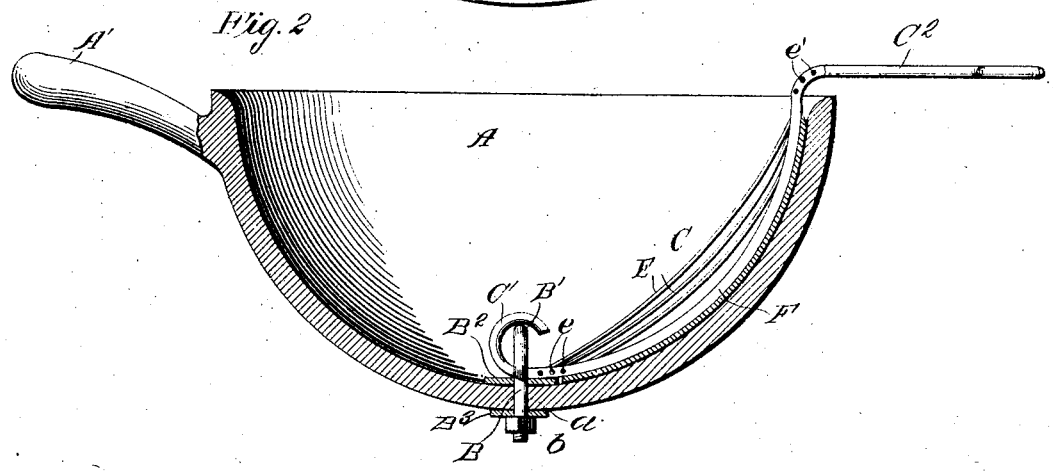
Figure 3:
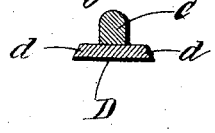

In the drawings, Figure 1 is a top plan view of my invention as in use. Fig. 2 is a vertical cross-section thereof on about line 2 2 of Fig. 1, and Fig. 3 is a detail section on about line 3 3 of Fig. 1.

The bowl A is provided with a handle A', by which it may be held in one hand, and has at its center the eyebolt B, having a shank journaled centrally in the bowl and provided at its upper end within the bowl with the eye B', with which engages the hook C' at the lower end of the beater-frame C. The bolt B passes through an opening $a$ in the bottom of the bowl at the center thereof and is secured by a nut $b$, washers $B^2$ and $B^3$ being provided surrounding the bolt at the inner and outer sides of the bowl, as best shown in Fig. 2, so the bolt can readily turn, and there will be practically no leakage from the bowl.

The beater-frame C is provided at its lower end with a hook C', engaging loosely with the eye B' of the bolt B, so the beater-frame can move freely up and down at its handle end, the hook engaging with the eye B' in such manner as to permit a certain lateral as well as rocking movement of the frame and the bolt B turning to permit any desired swinging movement of the beater-frame in the use of the invention.

The beater-frame C is preferably provided at its center with the double-edged blade D, edged at $d$, and on opposite sides of said blade D with the beater-rods E. As shown and preferred, the blade D is secured to the main rod F, which, like the blade, is curved longitudinally to conform to the curvature of the bowl, is bent at its lower end to form the hook C', and extended at its upper end to form the handle $C^2$, the blade D projecting slightly on opposite sides of the main bar F and edged at $d$, so that by slightly tilting the main bar one or the other edge may be brought to position to scrape the bowl. The beater-rods E are preferably of wire passed through openings $e$ near the lower end of the bar F and having their ends passed through openings $e'$ near the handle end of the main bar and bent. As shown, the beater-rods E are employed in three sections or lengths passing through the openings $e$ and extending at one end through the openings $e'$ and bent at their other ends either about the main bar F or into connection with the main bar or the other rods adjacent to the openings $e'$, as will be understood from Fig. 1 of the drawings.

In operation it will be noticed the operator may grasp the handle A' with one hand and the handle $C^2$ with the other hand and manipulate the beater C in such manner as to work the cake-dough in the desired manner and to scrape the dough from time to time from the bottom of the bowl, the journaled eyebolt and the hooked connection of the beater-frame therewith forming a projecting swivel connection between the beater-frame and the bowl, so the beater-frame may be manipulated within the bowl in any way desired by the operator.

It will be noticed that the beater-frame has a swivel connection at its lower end with the bowl; also, that such beater-frame is curved longitudinally to conform to the curvature of the bowl, so it may be operated to scrape the surface of the bowl, and such beater-frame is curved transversely, rounding upwardly from the blade or scraper to the outer beater-rods, such transverse curvature permitting the rocking of the beater-frame within the bowl, as will be understood from Figs. 1 and 2 of the drawings.

The construction is simple, inexpensive, and will be found efficient in the practical use of the invention.

Having thus described my invention, what I claim as new, and desire to secure by Letters Patent, is—

1. The cake-beater herein described comprising the curved bowl having a handle, the eyebolt having a shank journaled centrally in the bowl and provided with an eye within the bowl, and the beater-frame consisting of a main bar having a handle at its outer end and a hook at its inner or lower end engaged with the eye of the eyebolt, said main bar having perforations adjacent to said hook and also adjacent to its handle portion, the scraper secured to the main bar and curved therewith to coincide with the curvature of the bowl and the beater-rods on opposite sides of the scraper and passing through the openings in the main bar and secured substantially as and for the purposes set forth.

2. A cake-beater having a beater-frame provided with a main bar and on the under side of said main bar with a scraper-blade extending lengthwise of the main bar and projecting on opposite sides thereof, and with beater-rods, substantially as set forth.

3. A beater-frame having a main bar perforated for the beater-rods, a scraper extending lengthwise of and curved to conform to the main bar and secured to the under side of the main bar and projecting on opposite sides thereof, and beater-rods on opposite sides of the main bar and passed through the perforations in the said main bar, substantially as set forth.

4. A cake-beater having a beater-frame provided with a main bar curved longitudinally, a scraper-blade curved longitudinally in conformity with the main bar and secured to the under side of said main bar and projecting on opposite sides thereof, and beater-rods secured to the main bar, substantially as set forth.

MICHAEL A. RITTER.

Witnesses:
C. W. KING,
LESLIE S. HUGHES.